J. T. WILLIS.
Horse-Detacher.

No. 223,424.  Patented Jan. 6, 1880.

WITNESSES:
Chas. Nida
C. Sedgwick

INVENTOR:
J. T. Willis
BY Munn & Co
ATTORNEYS.

UNITED STATES PATENT OFFICE.

JOSEPHUS T. WILLIS, OF MOUNT STERLING, ALABAMA.

HORSE-DETACHER.

SPECIFICATION forming part of Letters Patent No. 223,424, dated January 6, 1880.

Application filed August 12, 1879.

*To all whom it may concern:*

Be it known that I, JOSEPHUS T. WILLIS, of Mount Sterling, in the county of Choctaw and State of Alabama, have invented a new and Improved Device for Detaching Horses, of which the following is a specification.

Figure 1:
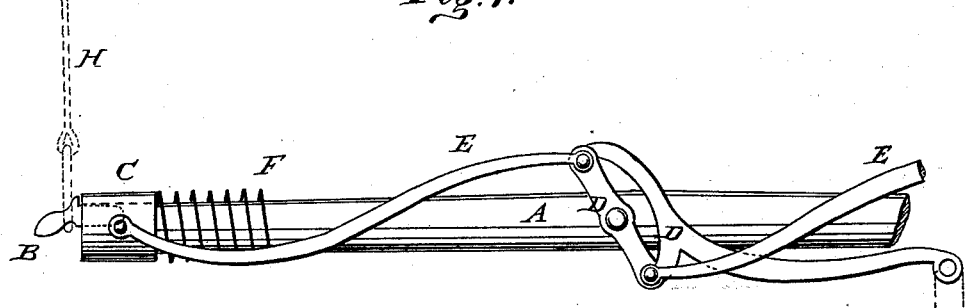
Figure 2:
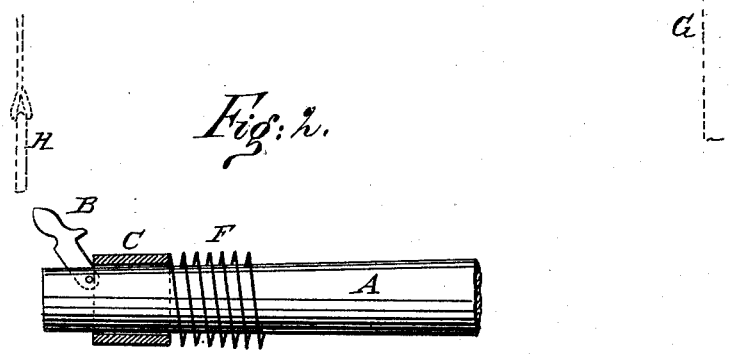

Figure 1 is a plan of the device. Fig. 2 represents a whiffletree, showing a locking-sleeve retracted and a trace-hook unlocked.

Similar letters of reference indicate corresponding parts.

The object of this invention is to provide a device for instantly detaching runaway or other horses from vehicles; and it consists of levers, sleeves, pivoted trace-hooks, and a helical spring arranged upon a whiffletree and operated as hereinafter described.

In the drawings, A represents the whiffletree, in each end of which is pivoted a trace-hook, B. C C are the locking sleeves or bands; D, the lever, pivoted centrally on the whiffletree; E E, the curved rods that connect the lever with the locking-bands; F, the helical spring around the whiffletree, and G the governing-strap.

In order to detach a horse harnessed to a vehicle provided with this device, the driver has but to pull upon the governing-strap, which is made fast to the free end of the forked lever D, and such pull will, operating through the levers and rods, draw inward the locking sleeves or bands to the position shown in Fig. 2, so as to unlock the trace-hooks, that the traces H may turn them on their pivots and become at once released. These parts of the device were patented by me February 22, 1876, and my improvement relates to combining with them the helical spring F, that serves to return the locking-sleeves over the trace-hooks and hold them in their original position so soon as the pull upon the governing-strap shall cease.

It will be seen that one strong spring of this kind will be sufficient to produce this result, for the movements of the sleeves are made synchronous by the connecting levers and rods.

Having thus fully described my invention, I claim as new and desire to secure by Letters Patent—

The helical spring F, in combination with the whiffletree A, trace-hooks B, locking-sleeve C, lever D, lever-rods E, and governing-strap G, as and for the purpose described.

JOSEPHUS T. WILLIS.

Witnesses:
R. H. HARMON,
T. C. HARMON.